United States Patent [19]

Brusasco et al.

[11] Patent Number: 5,315,194
[45] Date of Patent: May 24, 1994

[54] ACTUATOR DEVICE FOR AN ELECTRIC WINDOW WINDER

[75] Inventors: Enzo Brusasco, Turin; Giuseppe Boero, Candiolo, both of Italy

[73] Assignee: Roltra-Morse S.p.A., Cascine Vica-Rivoli, Italy

[21] Appl. No.: 752,482
[22] PCT Filed: Mar. 6, 1990
[86] PCT No.: PCT/IT90/00019
 § 371 Date: Sep. 9, 1991
 § 102(e) Date: Sep. 9, 1991
[87] PCT Pub. No.: WO90/10974
 PCT Pub. Date: Sep. 20, 1990

[30] Foreign Application Priority Data

Mar. 7, 1989 [IT] Italy ............... 52922/89[U]

[51] Int. Cl.$^5$ ............ H02K 11/00; H02K 5/04; H02K 9/22; E05F 11/40
[52] U.S. Cl. ................ 310/68 R; 310/64; 310/89; 49/337
[58] Field of Search .......... 310/64, 67 R, 68 R, 310/83, 89, 71; 74/89.15, 424.8 R; 49/324, 334, 337; 361/383, 386, 388, 389, 392, 688, 704, 707, 709, 714

[56] References Cited

U.S. PATENT DOCUMENTS

| | | | |
|---|---|---|---|
| 3,660,704 | 5/1972 | Paine et al. | 310/83 |
| 4,537,565 | 8/1985 | Edler | 310/64 |
| 4,679,451 | 7/1987 | Nakamura | 74/424.8 R |
| 4,712,030 | 12/1987 | Lakin et al. | 310/89 |
| 4,712,441 | 12/1987 | Abraham | 74/89.15 |
| 4,865,162 | 9/1989 | Morris et al. | 310/80 |
| 4,891,735 | 1/1990 | Mikolajczak | 361/386 |
| 4,903,535 | 2/1990 | Kikuta et al. | 74/89.15 |
| 4,964,198 | 10/1990 | McCarthy | 361/386 |
| 5,006,744 | 4/1991 | Archer et al. | 310/89 |

FOREIGN PATENT DOCUMENTS 0252481 1/1988 European Pat. Off. .
90/10774 9/1990 World Int. Prop. O. ..... 74/424.8 R Primary Examiner—Steven L. Stephan
Assistant Examiner—C. LaBelle

[57] ABSTRACT

An actuator device for an electric window winder (101) having an electric motor (104) and a window displacement actuator element (112) which is displaceable with respect to a frame (102) of the device under action of the electric motor (104). An electronic unit (27) for drive and control of the electric motor (104) has power elements and is housed in a first portion (120) of the frame (102), and the electric motor is housed in a second portion of (107) of the frame (102). The first and second portions (120, 107) of the frame (102) are formed by a single one-piece body part of the frame, and the power components of the electronic unit (27) are in direct thermal contact with the first portion (120), which is formed of a thermally conductive metal material for the dissipation of heat from the power components.

9 Claims, 2 Drawing Sheets

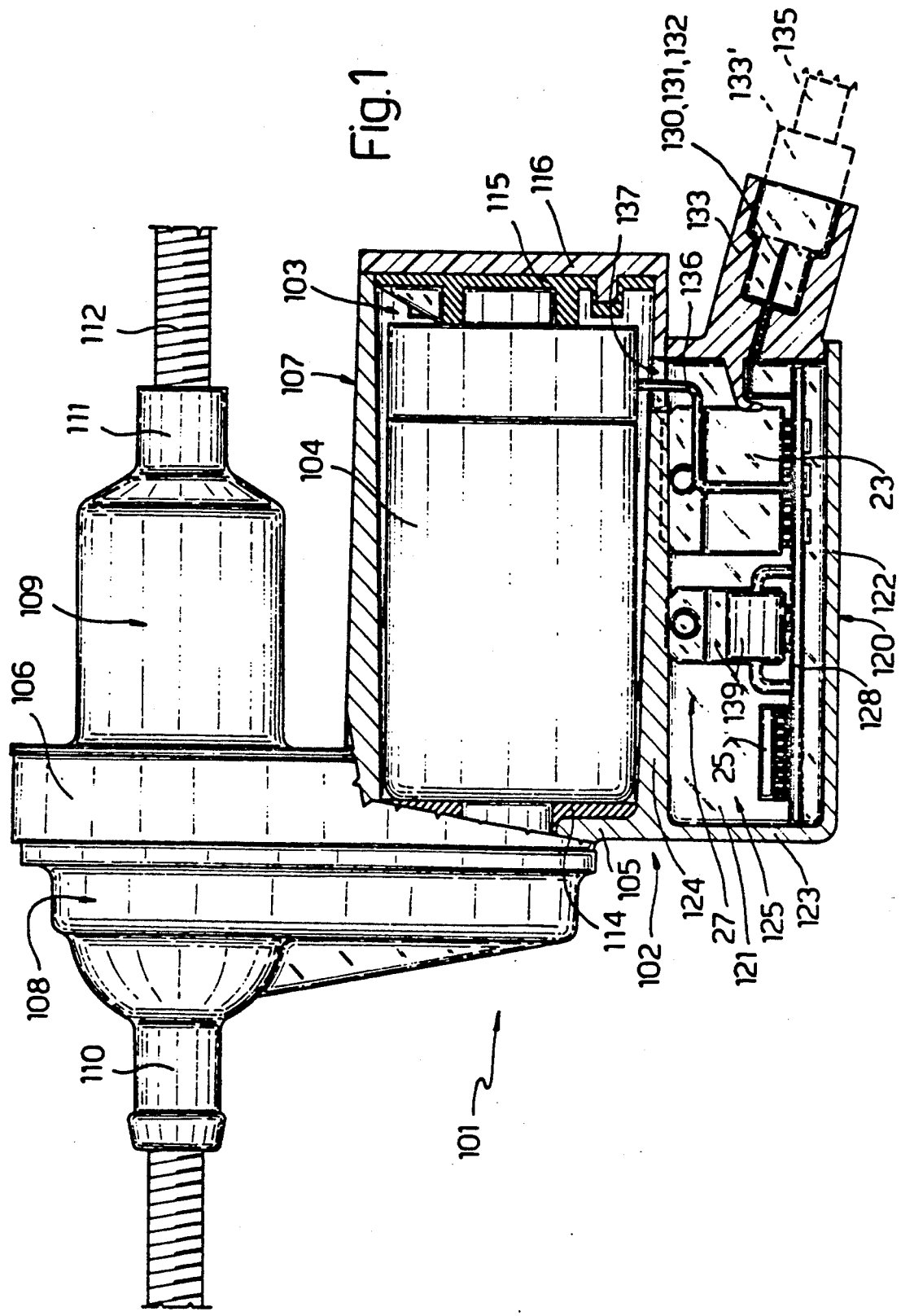

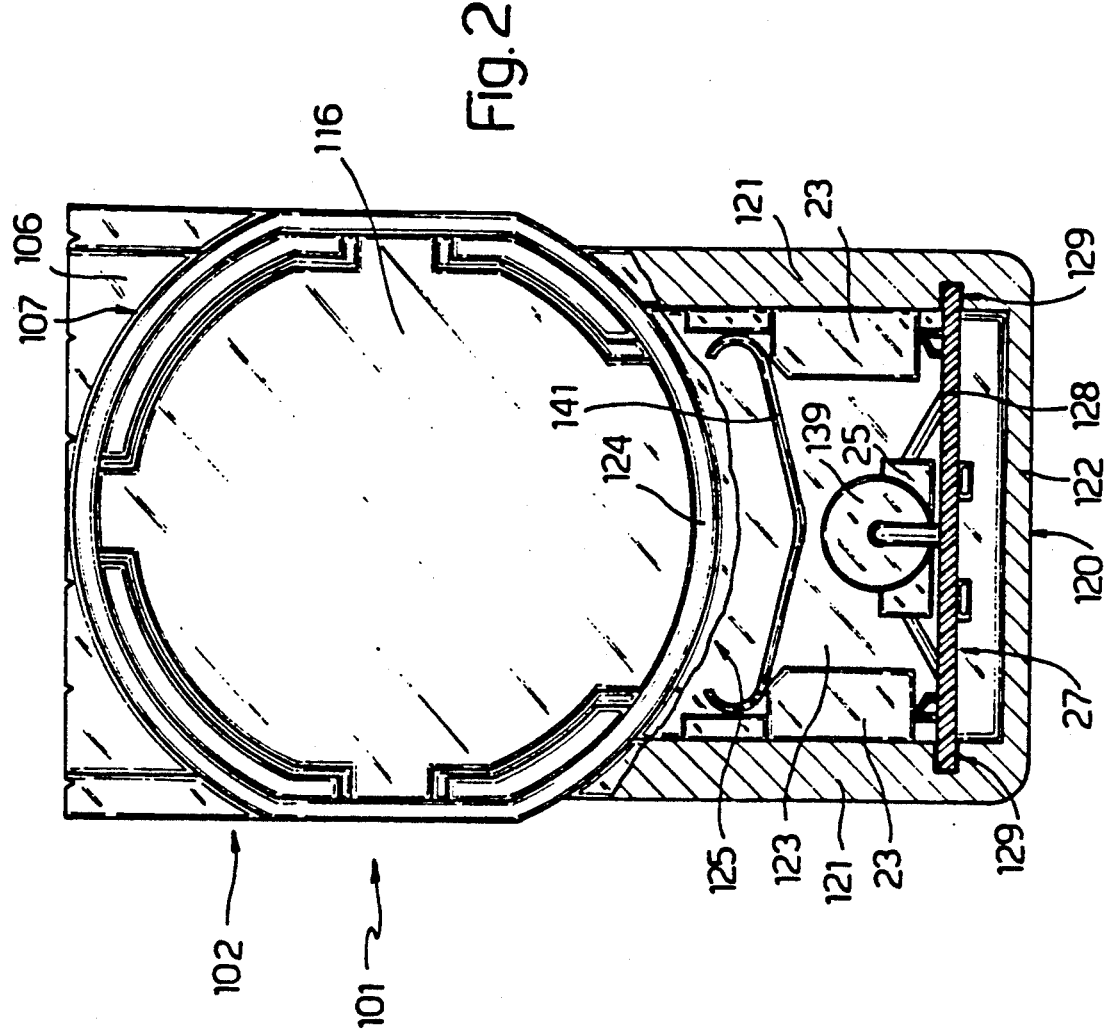

ACTUATOR DEVICE FOR AN ELECTRIC WINDOW WINDER

TECHNICAL FIELD

The present invention relates to an actuator device for an electric window winder, and in particular to such a device of the type in which a DC electric motor drives an element constituted by a pre-compressed screw, in a known way by means of a recirculating ball worm screw unit, to actuate the displacement of the window.

BACKGROUND ART

As is known, currently for drive and control of such actuator devices conveniently fitted on vehicles, in particular motor vehicles, use is currently made in practice of a wiring system with wires dedicated to the electrical supply of the motor, which lead from a common central control unit for various actuator devices, which include relay units, limiter circuits etc. This wiring system involves various disadvantages, including: the complexity and difficulty of positioning bundles of wires, the large number of electrical connections, the difficulty of identification in the case of failure, and the complexity of testing the operation of the installation during and/or after assembly on the vehicle. Therefore, there has been provided an actuator device, suitable for an electric window winder, comprising an electric motor for a window displacement actuator element, and including an electronic unit for drive and control of the electric motor, as shown in EP-A-0252481, so that the number of electric wires leading to the motor system can be reduced. In particular, the electronic unit is housed in a cover which is separate from the frame housing the electric motor, and which is then fixed by means of screws.

In this realization the frame must be produced in two pieces, which are then fixed together with a supplementary operation; there is not a good transmission of heat from the power components of the electronic unit to the frame of the actuator device, in fact between the cover and the frame housing the electric motor there is a gasket; and resin material is utilized covering the electronic unit to promoting the removal of heat from the power components in the cover.

DISCLOSURE OF INVENTION

It is an object of the present invention to provide an actuator device for an electric window winder, including an electronic unit for drive and control an electric motor of said device, designed to overcome the above drawbacks, i.e. which is very simple to produce and assemble, which has a good guarantee of functionality, and which is also suitable for a drive and control system of the type described in Italian Patent application entitled "A drive and Control System for a Plurality of Electrical Devices of a Vehicle", filed on the same date, corresponding to International Patent Application PCT/IT90/00023.

According to the present invention, there is provided an actuator device for an electric window winder, comprising an electric motor and a window displacement actuator element which is displaceable with respect to a frame of the device under the action of the said motor, and including an electronic unit for drive and control of the said electric motor, said electronic unit being housed in a portion of a frame of the said device, characterised by the fact that the said portion of the frame housing the said electronic unit is integral with the portion of the frame housing the said electric motor.

BRIEF DESCRIPTION OF DRAWINGS

For a better understanding of the present invention a particular embodiment thereof will now be described, purely by way of non-limitative example, with reference to the attached drawings, in which:

FIG. 1 is a partially sectioned side view of an electric window winder actuator device formed according to the principles of the present invention; and FIG. 2 is a partially sectioned front view of the actuator device of FIG. 1.

BEST MODE FOR CARRYING OUT THE INVENTION

With reference to FIG. 1, the reference numeral 101 generally indicates an actuator device for an electric window winder, which comprises, in a substantially known way, a main frame 102 in the form of a shaped container, conveniently made of aluminium, having a cylindrical portion 107 which forms a main cylindrical cavity 103 in which is housed a DC electric motor 104; upwardly from one end 105 of the cylindrical portion 107 this frame 102 extends a ring-shape portion 106 to which are fixed, on opposite sides, two respective deep drawn caps 108 and 109, which have respective outer end portions 110 and 111 with coaxial through-holes traversed by a pre-compressed screw 112 which is connected, in a known manner not illustrated, to a device for holding a window glass of a vehicle window, and which is coupled in a known way not illustrated, within the deep drawn cap 109, to a worm screw unit conveniently of the recirculating ball type, which is rotatably driven by the motor 104 through a transmission unit, conveniently a belt transmission unit, coupled to the shaft of the motor 104 itself.

The motor 104 is fixed within this cavity 103 by two resilient terminal packings 114 and 115 and by an external end plug 116 of circular form conveniently made of plastics material, which axially presses against the packing 115 and which is fixed to the extreme edge of the cavity 103 by cooperating coupling portions.

According to the present invention, beneath the cylindrical portion 107 of the frame 102 extends an integral portion 120 with two parallel side walls 121, a base wall 122 and an end wall 123 which form, with a sector 124 of the wall 107, a second cavity 125 underlying the cavity 103 and the longitudinal axis of which is parallel to the longitudinal axis of the cavity 103 itself.

Within this cavity 125 is housed an electronic unit 27 for drive and control of the electric motor 104 according to the system described in the said Italian Patent application entitled "Drive and Control System for a Plurality of Electrical Devices on a Vehicle". In particular, this unit 27 has a printed circuit 128 which is disposed with its lateral edges located in respective grooves 129 of the side walls 121 (FIG. 2) parallel and close to the bottom wall 122 of the portion 120, and to this printed circuit 128 are connected:

three electrical contact elements 130, 131, 132 (FIG. 1) conveniently of the blade type, which are housed in an insulating plug connector 133 fixed to the portion 120 and shaped in such a way as to form a substantially sealed closure for the end opening of the cavity 125 opposite the end wall 123; this connector 133 is adapted to couple with a corresponding connector block 133' (illustrated in broken outline) connected to the end of an electrical cable 135 having three electrical conductors, of which the first is a power level positive electrical supply line, the second is for transmission of information signals, and the third is an ground connection line. This electrical cable 135 conveniently leads from a main central control unit comprising a microprocessor and leads to the device 101 conveniently disposed in a vehicle door;

a pair of integrated circuits 23 for distribution of the electrical power supply to the motor 104 by means of associated electrical wires 136 passing through a slot 137 in the sector 124, and a second integrated circuit 25 for dealing with information signals relating to the operation of the motor 104. These integrated circuits 23 and 25 can conveniently include specific logic circuits or a microprocessor, solid state switches etc, and can include current and voltage overload protection circuits, diagnostic and control circuits etc, also in combination with other discrete circuit components 139, connected to the printed circuit 128. In particular, the integrated circuit 25 is disposed parallel to and above the printed circuit 128, whilst the integrated circuits 23 (FIG. 2) are disposed perpendicularly of the printed circuit 128 in parallel positions spaced from one another and contacting against the inner surface of the side walls 121 of the portion 120 to encourage the dissipation of heat of the power elements of the integrated circuits 23 themselves, and are held in these positions by means of a leaf spring 141 which engages with its ends between the upper portions of these integrated circuits 23.

INDUSTRIAL APPLICABILITY

The advantages obtained with the actuator device of the present invention are evident from what has been described. Infact, the housing of this electronic unit 27 is further achieved in an economic manner, with a simple modification of the conventional frame, by means of the integral portion 120, which does not substantially change the most critical dimensions of the device 101, which therefore can still be housed in the usual position in the door. This integral portion 120 further also achieves the necessary dissipation of heat for the power elements in the unit 27 which are housed in positions of thermal contact. The connector unit 133 further constitutes a closure and protection element for the electronic unit 27.

Finally, it is clear that the embodiment of the present invention described and illustrated can have modifications and variations introduced thereto without departing from the definition of the claims. For example, the configuration of this integral portion 120, and the manner in which the integrated circuits 23 and 25 are housed can be varied.

We claim:

1. An actuator device for an electric window winder having an electric motor and a window displacement actuator element which is displaceable with respect to a frame of the device under action of the electric motor, comprising an electronic unit for drive and control of the electric motor, said electronic unit having active power elements and being housed in a chamber formed by a first portion of said frame, and said electric motor being housed in a chamber formed by a second portion of the frame; wherein said first and second chambers share a common intervening wall; wherein said first portion and said second portion are formed by a single one-piece body part of said frame; and wherein the power components of the electronic unit are in direct thermal contact with said first portion, which is formed of a thermally conductive metal material for the dissipation of heat from said power components, and are connected to said electric motor through an opening in said intervening wall.

2. A device according to claim 1, further comprising resilient means for holding said power components against said first portion of the frame.

3. A device according to claim 1 or 2, wherein said first portion of the frame has a main longitudinal axis which is parallel to a main longitudinal axis of said second portion.

4. A device according to claim 1 or 2, wherein said electronic unit has a three element connector for external connection to an electrical connection cable including a first, power level positive electrical supply conductor, a second, information signal transmission conductor, and a third, ground connection conductor.

5. A device according to claim 4, wherein said first portion is closed by means of said electrical connector.

6. A device according to claim 1 or 2, wherein said electronic unit includes at least a first integrated circuit for the distribution of electrical power supply for operation of said electric motor, and at least a second integrated circuit for handling of information signals relating to operation of said electric motor.

7. A device according to claim 1 or 2, wherein said electronic unit includes at least one of diagnostic means and means for indicating possible breakdowns in the device.

8. A device according to claim 1 or 2, wherein said window displacement actuator comprises a precompressed screw and is displaceable by said motor via a recirculating ball worm screw unit.

9. An electric window winder for a motor vehicle comprising an electric motor, a window displacement actuator element which is displaceable with respect to an actuator frame under action of the electric motor, and an electronic unit for drive and control of the electric motor, said electronic unit having active power elements and being housed in a first portion of said actuator frame, said electric motor being housed in a second portion of the actuator frame, and said actuator element being received in a third portion of the actuator frame; wherein said first portion, said second portion, and said third portion of the actuator frame are formed by a single one-piece body part of said actuator frame; and wherein the power components of the electronic unit are in direct thermal contact with said first portion, which is formed of a thermally conductive metal material for the dissipation of heat from said power components.

* * * * *